April 9, 1935.  W. W. WOOD  1,996,782
FILM MAGAZINE FOR PICTURE PROJECTORS
Filed June 6, 1933  3 Sheets-Sheet 1
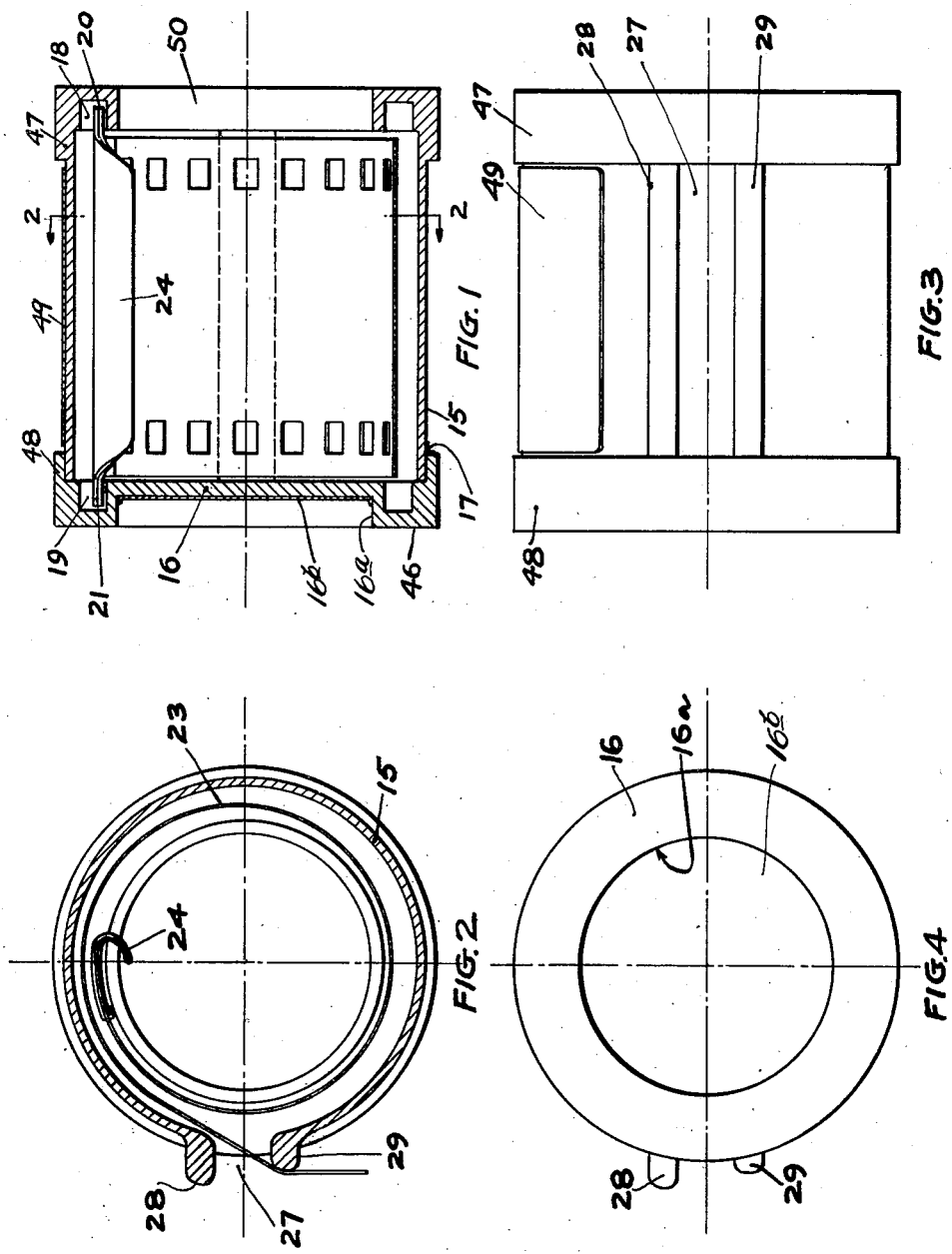
INVENTOR
*William W. Wood*
BY
ATTORNEY April 9, 1935. W. W. WOOD 1,996,782
FILM MAGAZINE FOR PICTURE PROJECTORS
Filed June 6, 1933 3 Sheets-Sheet 2
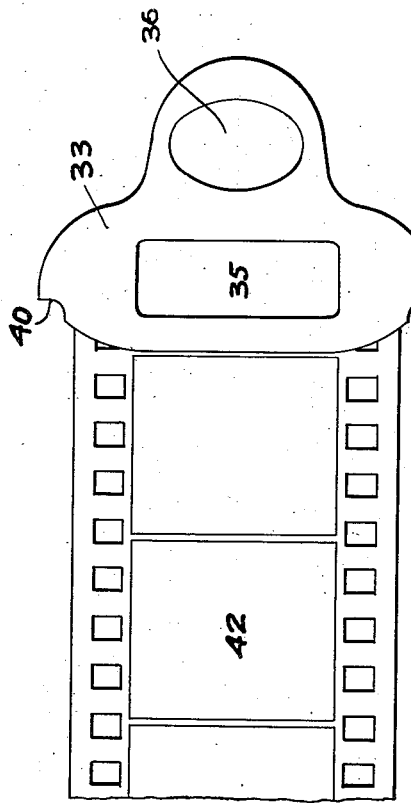
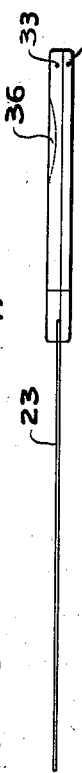
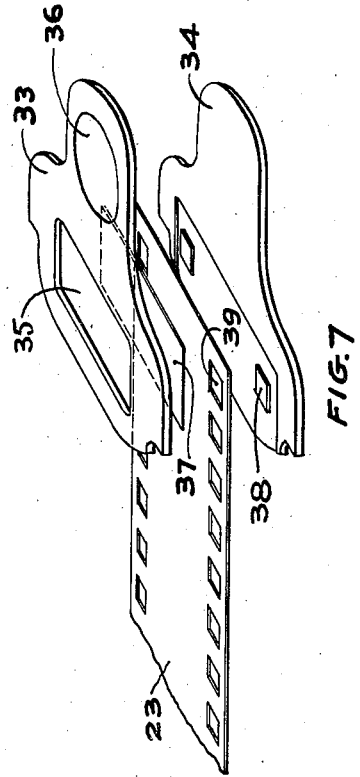
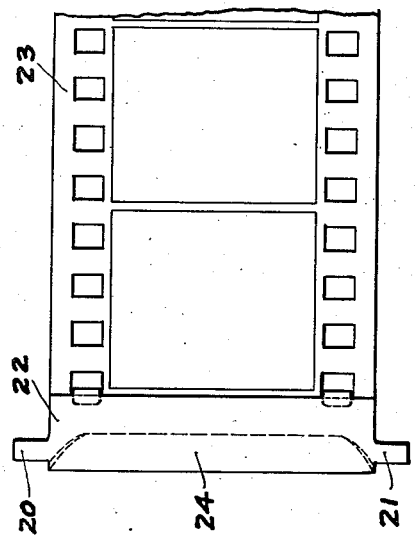
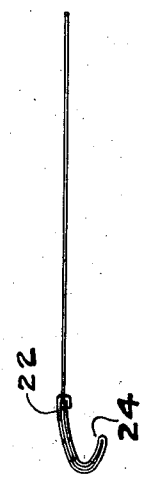
INVENTOR
*William W. Wood*
BY
ATTORNEY April 9, 1935. W. W. WOOD 1,996,782
FILM MAGAZINE FOR PICTURE PROJECTORS
Filed June 6, 1933 3 Sheets-Sheet 3
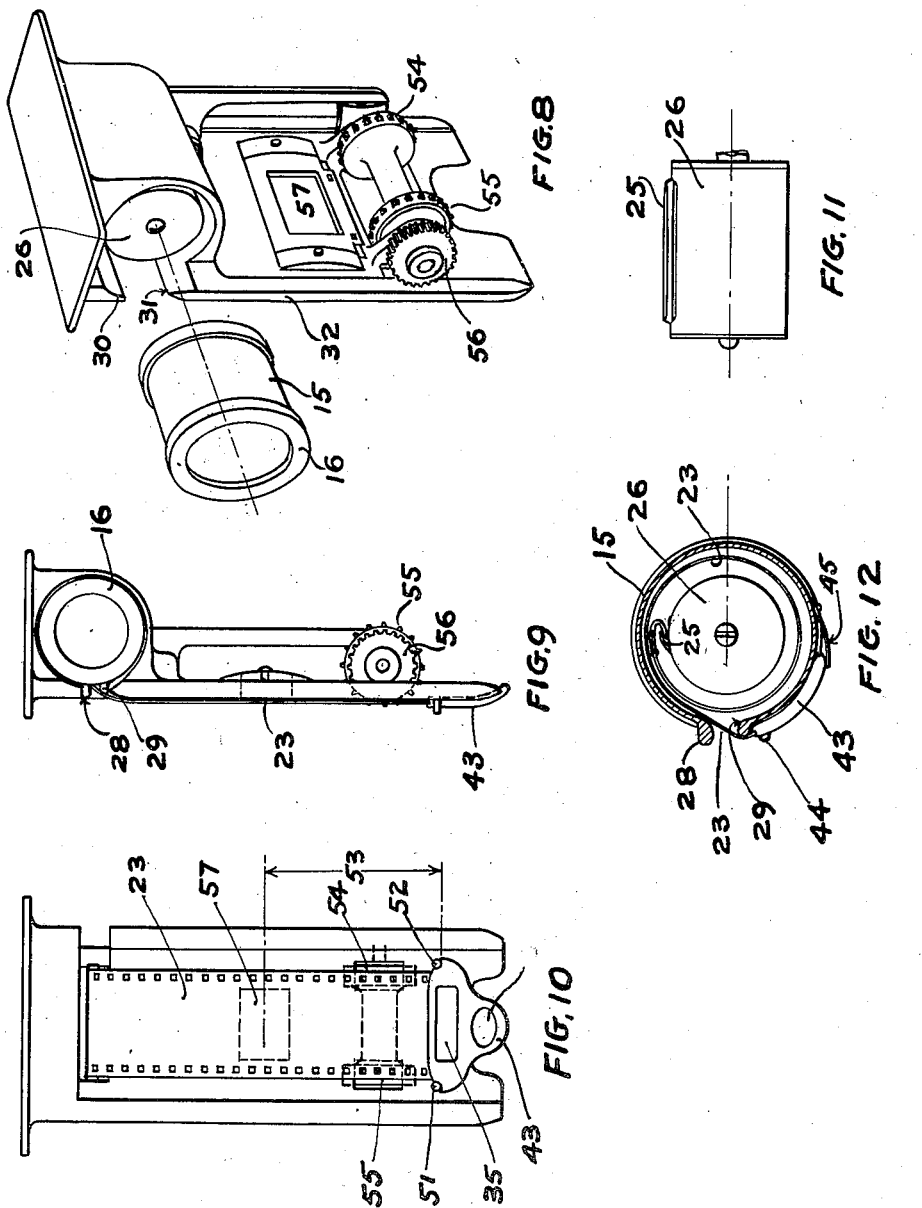
INVENTOR
William W. Wood
BY
ATTORNEY Patented Apr. 9, 1935

1,996,782

UNITED STATES PATENT OFFICE 1,996,782

FILM MAGAZINE FOR PICTURE PROJECTORS

William W. Wood, New York, N. Y., assignor to Visomatic Systems, Inc., a corporation of New York Application June 6, 1933, Serial No. 674,497

22 Claims. (Cl. 242—71)

This invention relates to a film magazine or container for picture projectors and is a continuation in part of the application filed June 25, 1932, Ser. No. 619,288, now Patent No. 1,956,938 dated May 1, 1934, entitled "Film tensioning and positioning devices for photograph projectors".

In the aforesaid application is shown a film tensioning reel and film container, and the instant application is directed to improvements in the container, only sufficient of the tensioning reel and its associated mechanism being shown to illustrate the use of the present invention.

The objects of the invention will more fully hereinafter appear, but among these may be mentioned the provision of a film magazine permanently attached to the film and particularly adapted for use in devices as described in the aforesaid co-pending application.

Another object is the provision of a film magazine that cannot be removed from the film without destroying the magazine.

Still another object is to provide a film magazine to which suitable labels or other indicia can be readily attached in order to identify the film contained therein.

In the accompanying drawings where by way of illustration one form of the device is shown:

Fig. 1 is a horizontal sectional view of the film magazine and film;

Fig. 2 is a sectional view on the line 2—2 of Fig. 1;

Fig. 3 is an external side view of the complete magazine shown in Fig. 1;

Fig. 4 is an external end view of the magazine shown in Fig. 1;

Fig. 5 is a plan view of the film used in the magazine Fig. 1;

Fig. 6 is a side view of the film Fig. 5;

Fig. 7 is a disassembled view of the finger clip used on the film Fig. 5;

Fig. 8 is a view of a complete film gate suitable for use in a picture projector, showing the film magazine forming the subject matter of this application ready for insertion therein;

Fig. 9 is a side view of the complete film gate Fig. 8;

Fig. 10 is a view of the film side of the gate Fig. 8;

Fig. 11 is a view of the tensioning device for operating the film magazine as used in the mechanism shown in Fig. 8; and Fig. 12 is a sectional view corresponding to Fig. 2 but showing a curved finger clip on the film, held in place against the outside of the magazine.

The numeral 15 denotes the magazine casing which may be made of metal or any suitable molded material, such as bakelite, or the like, provided with an end cap 16 of suitable material adapted to be cemented to the casing after the film has been placed therein, as hereinafter described, parts 15 and 16 being secured together in such a manner that they cannot be separated without destroying them, except by the use of special tools. One manner of joining these parts, if they are made of bakelite, is to secure them together where they join at 17 with a suitable cement. Many methods of joining the parts, if they are of metal, can be used that will require soldering or welding and which will make necessary special means for separating the parts, which means are not ordinarily available to the users of such magazines.

The casing 15 is provided with an annular interior groove 18 and the cap 16 is provided with a similar groove 19, and when the parts 15 and 16 are secured together the projecting tabs 20 and 21 of the inside clip 22, secured to the film 23, extend into these grooves and hold the film in place so that it cannot be removed from the magazine.

The film and magazine is assembled by rolling the film up, placing the inside clip 22 in the magazine, having its outwardly extending lip 24 extending towards the center of the magazine, as shown in Fig. 2, so that this lip will engage the clip 25 of the film tensioning device 26, hereinafter referred to, when the magazine is in place in the film gate and ready for use.

The outer end of the film extends through a slot 27 in the magazine, this slot being provided with two outwardly extending edges 28, 29 which serve to position the magazine in the film gate by engaging the lips 30 and 31 of the framework 32 thereof. The edge 28 extends outwardly further than the edge 29 in order that the latter may form an abutment or support for the film end of the curved finger clip, hereinafter described in conection with Fig. 12. For the sake of clarity, only one or two turns of film have been shown in the magazine, and it will be understood that the magazine may be of any suitable size to hold any desired number of turns of film.

The outer end of the film is provided with a suitable finger clip which may be molded or otherwise permanently attached to the film. This clip may consist of an upper portion 33 and a lower portion 34, molded of bakelite or the like, the upper portion being apertured, as shown at 35, and being provided with a hollow indentation 36, serving as a finger hold. A suitable name plate 37 may be positioned under the aperture 35 and the parts 33 and 34 cemented together, including the film 23 and the name plate therebetween. The lower member 34 may be provided with suitable lugs 38 adapted to engage one or more of the perforations 39 in the film. The finger clip is provided with stop portions 40 and 41 which bear a definite position in respect to the perforations 39 in the film in order to definitely locate some certain "frame", such as 42, on the film in respect to the projection apparatus with which the magazine is used.

If preferred, the form of finger clip shown in Fig. 12 may be used. Here the clip 43 is curved to fit the outer contour of the magazine 15. Otherwise the clip is the same. A spring 45 is secured to the magazine to hold the clip 43 in place and the edge 29, being shaped as shown, permits the film 23 to lie below a line drawn across the upper surface at the point 44 of the clip 43 and the outer end of edge 28, thereby protecting the film.

The cap 16 has a hollow center portion 16a adapted to receive a label 16b of any suitable type, which, being below the outer surface 46 of the cap is protected from injury.

The body of the casing 15 has a flange 47 and the cap 16 a flange 48, and between these flanges and below the outer surface of same where it will be protected, may be placed a label 49.

The film 23, having been put into the magazine as previously described, it will be evident that it is free to be curled therein as the tabs 20, 21 can slide around in grooves 18, 19. The casing 15 has a central aperture 50 adapted to permit the casing to be mounted on the film tensioning device 26 so that the magazine fits thereon as shown in Fig. 9, the magazine being prevented from turning by the edges 28, 29 which engage the lips 30, 31 of the frame 32.

The lip 24 on clip 22 engages clip 25 on the tensioning device which is spring-actuated as more fully described in appln. S. N. 619,288, to always keep the film wound up.

The film may now be pulled out of the magazine against the tension of the springs in the tensioning device 26, by grasping finger clip 43, and the stops 40, 41 slipped over the pins 51, 52 thereby definitely defining the distance 53, Fig. 10, which definitely locates the first picture or "frame" 42 to be displayed.

The film is engaged by the usual driving sprockets 54, 55 which are driven by a gear 56 which meshes with the driving gear in the projector.

The entire film gate with the magazine in place may be used in a projector of the type shown and described in the co-pending appln. S. N. 643,368, filed Nov. 19, 1932, now Patent No. 1,964,446 dated June 26, 1934, and when positioned therein the aperture 57 is properly positioned in respect to the light source and projecting lens to project the pictures on film 23 on a suitable screen.

The pictures may be displayed one at a time by turning the gear 56, and if at any time it is desired to go back and display a picture already shown, by turning gear 56 backward, the film 23 will be drawn back into the magazine by the spring-operated device 26 which acts like an ordinary shade roller in this respect. This obviates the necessity of any rewind and simplifies the apparatus. When the complete film has been displayed, by releasing same from the sprockets 54, 55 the entire film will be drawn back into the magazine, which can then be withdrawn from the apparatus, Fig. 8, as a unit.

From the foregoing it will be seen that while the film is always wound ready for use, and its use is facilitated by the magazine described, at no time can the film be detached or separated from the magazine.

Because of the peculiar construction of the magazine it is impossible to improperly place the film into the film gate and projector, as the magazine will only fit in the film gate in one position on account of the aperture 50 and the edges 28, 29 of the magazine which engage the lips 30, 31 of the film gate and properly position the magazine and film thereon. As it is impossible to detach the film from the magazine it cannot be reversed, nor can it be rewound in the wrong direction, which often occurs with other arrangements.

By providing the magazine permanently attached to the film it makes the use of "bootleg" film in a projector of the type described in application Ser. No. 643,368 difficult, and thereby prevents the showing of unauthorized films in such machines.

The magazine being made of non-inflammable material and enclosing practically the entire film, it acts as its own container or shipping case and protects the film from dust, scratches and rough handling.

What is claimed is:

1. A film magazine for projectors comprising a tubular casing with a slot formed therein and having an open center portion adapted to be engaged by and supported on the projector, a film within said casing adapted to be withdrawn therefrom and rewound therein, and means carried by the inner end of said film to prevent its entire removal from said casing.

2. A film magazine for picture projectors comprising a tubular casing having an open center portion adapted to engage a portion of a projector whereby said casing is supported thereon and having a longitudinal body portion with a slot formed therein, a cap for said casing, and a film adapted to be enclosed within said casing and cap, said film having an end irremovably held within said casing and an end projecting from said casing through the slot therein.

3. A film magazine for picture projectors comprising an open-ended casing having an interior annular groove of greater diameter than the open end of said casing, a cap for one end of said casing adapted to close the open end thereof and having an annular groove therein of greater diameter than the open end of said casing, a film, and a member secured to said film and slidably secured in said annular grooves.

4. A film magazine for picture projectors comprising a tubular casing having an open center portion adapted to engage a portion of a projector whereby said casing is supported thereon, a cap, and a film having a laterally extending clip engaging said casing and cap on the interior of same whereby separation of said magazine and film is prevented.

5. In combination, a magazine comprising a casing and a cap therefor, a film adapted for free movement within said magazine, and means engaging said film and conjointly engaged by said casing and said cap to prevent the separation of said film from the magazine.

6. In combination, a tensioning device adapted to form part of a picture projector, a film magazine mounted thereon, a film in said magazine, engaging means between said film and said device whereby said film may be wound into said magazine by the action of said device, and means for slidably securing said film in said magazine whereby the separation of same is prevented.

7. In combination, a film magazine having an annular groove therein, and a film having means on its inner end movably mounted within said groove to prevent separation of the film from said magazine, said film also having its outer end extending from said magazine.

8. The combination as claimed in claim 7 wherein the outer end of the film is provided with a finger clip permanently secured thereto.

9. The combination as claimed in claim 7 wherein the outer end of the film is provided with a finger clip including a label permanently secured thereto.

10. The combination as claimed in claim 7 wherein the outer end of the film is provided with a finger clip curved to fit the outer contour of the magazine.

11. A film magazine comprising a casing having open ends, a flange at one end thereof, a longitudinal slot formed in and extending along the body portion of said casing to said flange, a cap secured to said casing, said casing and cap having annular grooves formed in their interiors, a film clip movably secured in said grooves, and a film having one end secured to said clip and thereby permanently associated with said magazine when said cap and casing are secured together.

12. The film magazine as claimed in claim 11, wherein the edges of the slot extend outwardly from the casing.

13. The film magazine as claimed in claim 11, wherein the cap is provided with a flange which together with the flange on the casing is of greater diameter than the body of the casing between the flanges.

14. A film magazine comprising a hollow cylindrical casing containing a film secured thereto and adapted to be repeatedly unwound from and rewound therein and a closure cap having a depressed center portion and enclosing one end of said casing, said depressed portion being adapted to receive a label.

15. A film magazine comprising an open ended cylindrical casing, a cap secured to one end of said casing and closing the same, film retaining grooves in said casing and cap, and a longitudinal slot in said casing intermediate its ends.

16. In combination, a film magazine comprising a cylindrical casing having an outwardly extending flange, a cap having a flange adapted to engage said casing, said casing having a body portion between said flanges of lesser diameter than said flanges, a slot formed in said body portion, and a film having means on its inner end slidably secured within said casing, said film also projecting through said slot.

17. In combination with a film magazine comprising a closed cylindrical casing having a slot formed therein, a film within said magazine and extending through said slot, a clip secured to the inner end of said film within and slidably engaging said magazine, and a second clip secured to said film outside of said magazine.

18. The combination as claimed in claim 17, wherein one of said clips has portions located a definite distance from one of the "frames" on the film.

19. In combination, a rewind mechanism, a cylindrical film holder having a film, carrying means movably secured therein supported by said mechanism, a film carried by said means, and means on said mechanism for engaging and rewinding said film in said holder.

20. In combination, a tubular film holder having a film movably secured therein and permanently associated therewith by means engaging the inner end of the film and the interior of the holder, said film adapted to be wound in said holder so as to lie closely adjacent the inner tubular wall thereof leaving a free space in the center of the holder whereby the same may be mounted upon a rotatable support.

21. In combination, a rewind mechanism comprising a rotatable member, a film magazine adapted to fit over said member, and a film having its inner end slidably connected to said magazine and having means secured thereto adapted to be engaged by said member whereby the film may be rewound in said magazine, said magazine and film being detachable from and replaceable on said member as a unit without disassociating the film from the magazine.

22. In combination, a framework having a revolvable rewind member, a film magazine mounted on said member, said magazine containing a film with its inner end carrying means slidably engaging said magazine and securing said film thereto, and cooperating parts on said magazine and framework whereby the magazine is definitely and removably positioned on the framework in respect to said member.

WILLIAM W. WOOD.